(12) United States Patent
Sato et al.

(10) Patent No.: US 10,274,037 B2
(45) Date of Patent: Apr. 30, 2019

(54) VIBRATION-DAMPING DEVICE AND ATTACHMENT STRUCTURE FOR VIBRATION-DAMPING DEVICE

(71) Applicant: BRIDGESTONE CORPORATION, Tokyo (JP)

(72) Inventors: Nobuaki Sato, Kawasaki (JP); Masayoshi Kawada, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/526,423

(22) PCT Filed: Nov. 9, 2015

(86) PCT No.: PCT/JP2015/005588
§ 371 (c)(1),
(2) Date: May 12, 2017

(87) PCT Pub. No.: WO2016/088299
PCT Pub. Date: Jun. 9, 2016

(65) Prior Publication Data
US 2017/0321775 A1 Nov. 9, 2017

(30) Foreign Application Priority Data

Dec. 2, 2014 (JP) ................. 2014-244309
May 27, 2015 (JP) ................. 2015-107423

(51) Int. Cl.
*F16F 1/38* (2006.01)
*F16F 15/08* (2006.01)

(52) U.S. Cl.
CPC .............. *F16F 1/38* (2013.01); *F16F 1/3849* (2013.01); *F16F 1/3863* (2013.01); *F16F 15/08* (2013.01); *F16F 2228/08* (2013.01)

(58) Field of Classification Search
CPC . F16F 1/38; F16F 1/3849; F16F 15/08; B60G 2204/41; B60G 2204/143; B60G 7/02
See application file for complete search history.

(56) References Cited

U.S. PATENT DOCUMENTS 2,932,507 A * 4/1960 Muller ................. B60G 7/02
267/269
3,392,971 A * 7/1968 Herbenar ............. B60G 7/02
267/268
(Continued)

FOREIGN PATENT DOCUMENTS

DE 10 2013 012 647 A1 2/2014
JP 09-166169 A 6/1997
(Continued)

OTHER PUBLICATIONS

International Search Report for PCT/JP2015/005588 dated Feb. 2, 2016.
(Continued)

*Primary Examiner* — Vishal R Sahni
(74) *Attorney, Agent, or Firm* — Sughrue Mion, PLLC

(57) ABSTRACT

Included are an outer attachment member 12, which is coupled to one of a vibration generator 16 and a vibration receiver, an inner attachment member 11, which is coupled to the other one of the vibration generator 16 and the vibration receiver, and an elastic body 13, which is positioned on the outer side of the inner attachment member 11 to couple the outer attachment member 12 and the inner attachment member 11. The outer attachment member 12 is disposed in at least one pair on the outer side of the elastic body 13, with the inner attachment member 11 being interposed between the at least one pair of outer attachment members 12. Each of the at least one pair of outer attachment members 12 includes an attachment surface 14, which is (Continued)

attached to the one of the vibration generator 16 and the vibration receiver.

11 Claims, 9 Drawing Sheets

(56) References Cited

U.S. PATENT DOCUMENTS

| | | | | |
|---|---|---|---|---|
| 3,961,813 | A * | 6/1976 | Thomas | B60D 1/02 |
| | | | | 267/138 |
| 4,183,496 | A * | 1/1980 | Brock | F16F 1/387 |
| | | | | 248/638 |
| 5,127,698 | A * | 7/1992 | Konig | B60G 99/004 |
| | | | | 248/635 |
| 5,397,113 | A | 3/1995 | Kojima et al. | |
| 5,944,297 | A * | 8/1999 | Flower | F16F 1/3842 |
| | | | | 248/632 |
| 7,581,721 | B2 * | 9/2009 | Kobayashi | F16F 1/3863 |
| | | | | 267/140.12 |
| 2006/0278030 | A1 * | 12/2006 | Tavel | B62D 1/16 |
| | | | | 74/492 |
| 2010/0327501 | A1 | 12/2010 | Neureder | |

FOREIGN PATENT DOCUMENTS

| | | |
|---|---|---|
| JP | 11-325147 A | 11/1999 |
| JP | 2004-301196 A | 10/2004 |
| JP | 2011-117512 A | 6/2011 |
| WO | 2014/074053 A1 | 5/2014 |

OTHER PUBLICATIONS

Communication dated Nov. 28, 2017 from the European Patent Office in counterpart application No. 15864607.5.

* cited by examiner

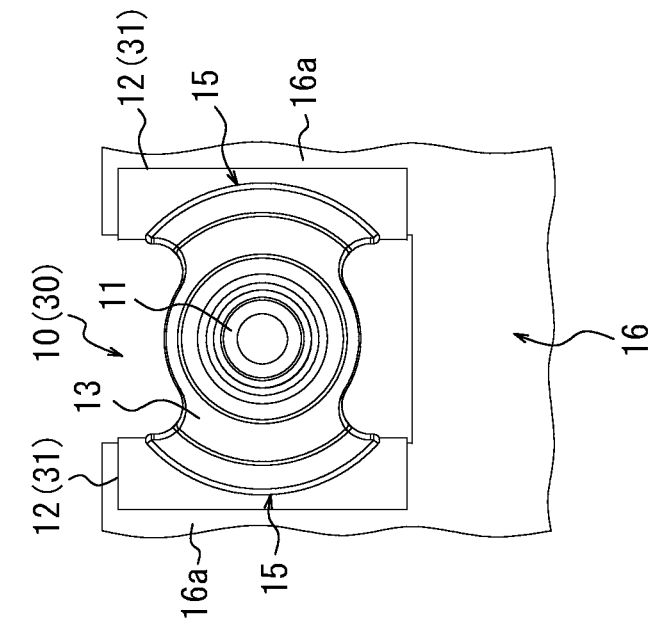
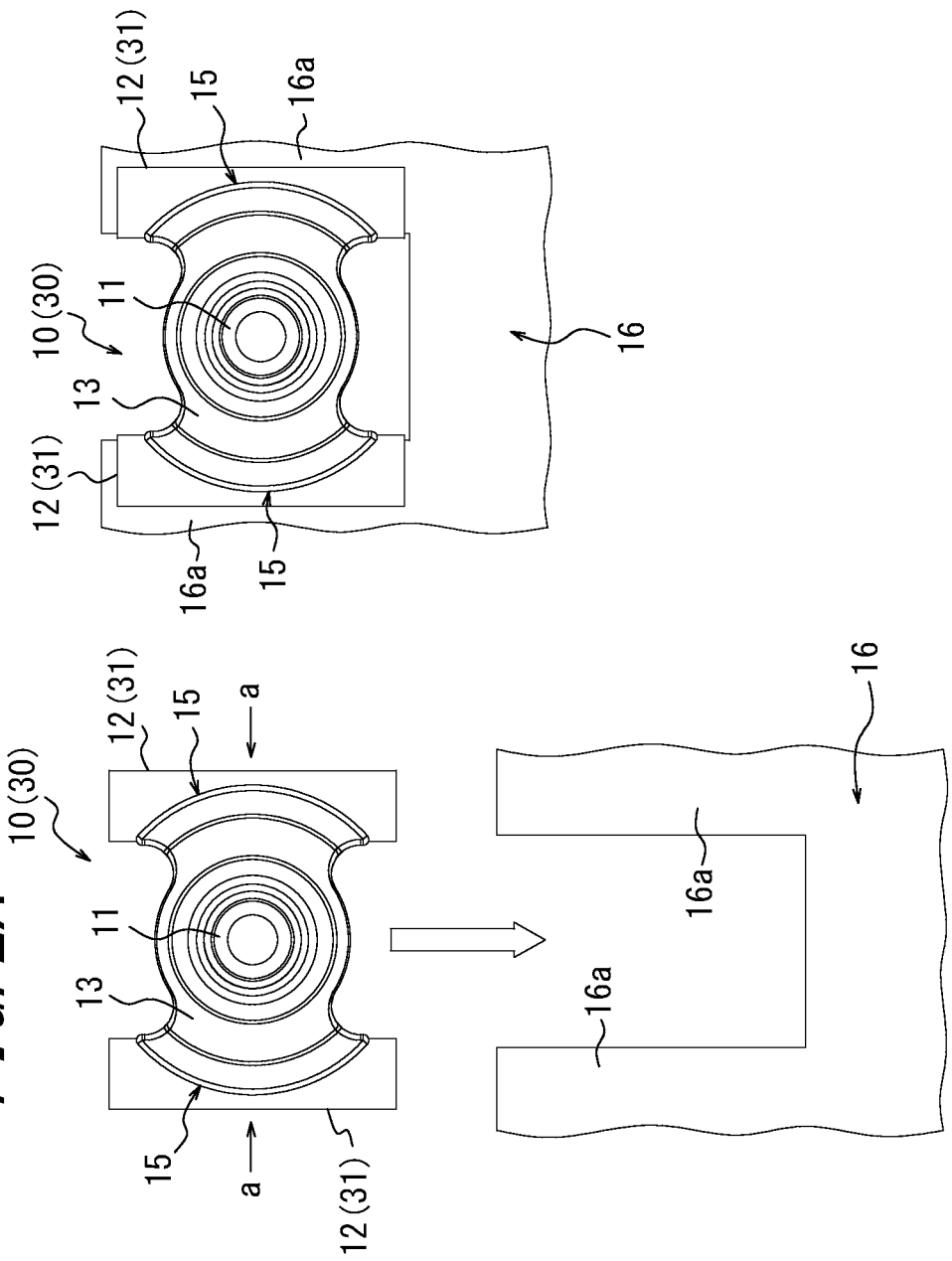

2

VIBRATION-DAMPING DEVICE AND ATTACHMENT STRUCTURE FOR VIBRATION-DAMPING DEVICE

CROSS REFERENCE TO RELATED APPLICATIONS

This application is a National Stage of International Application No. PCT/JP2015/005588 filed Nov. 9, 2015, claiming priority based on Japanese Patent Application No. 2014-224309 filed Dec. 2, 2014 and 2015-107423 filed May 27, 2015, the contents of all of which are incorporated herein by reference in their entirety.

TECHNICAL FIELD

The present disclosure relates to a vibration-damping device and an attachment structure for a vibration-damping device.

BACKGROUND

Vibration-damping devices may be conventionally disposed between vibration generators, such as engines, and vibration receivers, such as vehicle bodies, in automobiles, industrial machinery, or the like. Such a vibration-damping device may be used to absorb and damp vibration generated by the vibration generators.

Examples of the vibration-damping device may include vibration-damping rubber (refer to Patent Literature 1) that includes an outer tube, which has, in an upper portion thereof, a flange protruding substantially perpendicularly, and an inner tube, which is accommodated in the outer tube and which has the same axial direction as the outer tube. The flange included in the outer tube is maintained at a position lower than an upper end of the inner tube, and a rubber elastic body is integrated by vulcanization adhesion between an inner circumferential surface of the outer tube and a flange surface, and an outer circumferential surface of the inner tube.

In the aforementioned vibration-damping rubber, for example, two pieces of the vibration-damping rubber may be combined in a manner such that the respective flanges are disposed adjacent to each other. The combined pieces of the vibration-damping rubber may be embedded between a skeleton bracket and a receiving bracket, which are disposed in parallel with each other. With an engine attach bracket being sandwiched between both the flanges, a nut is screwed onto a bolt, which extends thought the skeleton bracket, the inner tubes in communication with each other, and the receiving bracket. By dosing so, the combined pieces of the vibration-damping rubber may be used as a sandwich type, in which the respective rubber elastic bodies are mounted in their compressed state.

CITATION LIST

Patent Literature

PL1: JP2004301196A

SUMMARY

Technical Problems

However, combining two pieces of the vibration-damping rubber, which each include the outer tube, and using them by mounting therein the rubber elastic bodies in their axially-compressed state, with the engine attach bracket being sandwiched therebetween, poses the following problems. That is to say, two pieces of the vibration-damping rubber are needed in every location where the vibration-damping rubber is assembled, and the number of components is increased. Besides, pre-compression cannot be applied in a direction in which surfaces of combined two pieces of the vibration-damping rubber extend, that is to say, in a direction that is orthogonal to the axial direction, and there is room for improvement in terms of durability in the direction of the combined surfaces.

Accordingly, the present disclosure is to provide a vibration-damping device and an attachment structure of the vibration-damping device that prevent an increase in the number of components at the time of assembling and mounting the vibration-damping device to a mounted object and that allow pre-compression to be applied to the vibration-damping device in the direction perpendicular to the axis.

Solution to Problems

One of aspects of the present disclosure resides in a vibration-damping device, including
outer attachment members configured to be coupled to one of a vibration generator and a vibration receiver,
an inner attachment member configured to be coupled to another one of the vibration generator and the vibration receiver, and
an elastic body positioned on an outer side of the inner attachment member and coupling the outer attachment members with the inner attachment member, wherein
at least one pair of the outer attachment members are disposed on the outer side of the elastic body, with the inner attachment member being interposed between the at least one pair of outer attachment members, and
each of the at least one pair of outer attachment members includes an attachment surface that is configured to be attached to the one of the vibration generator and the vibration receiver.

Another aspect of the present disclosure resides in an attachment structure for the vibration-damping device according to the present disclosure, wherein the vibration-damping device is coupled to the one of the vibration generator and the vibration receiver via the at least one pair of outer attachment members of the vibration-damping device, by displacing the outer attachment members in an extending direction of the outer attachment members, while bringing the outer attachment members closer to each other toward the inner attachment member of the vibration-damping device, so as to mount the outer attachment members to the one of the vibration generator and the vibration receiver.

Yet another aspect of the present disclosure resides in a vibration-damping device, including
an outer attachment member configured to be coupled to one of a vibration generator and a vibration receiver,
an inner attachment member configured to be coupled to another one of the vibration generator and the vibration receiver, and
an elastic body positioned on an outer side of the inner attachment member and coupling the outer attachment member with the inner attachment member, wherein
at least one pair of the outer attachment members are disposed on the outer side of the elastic body, with the inner attachment member being interposed between the at least one pair of outer attachment members, each of the at least one pair of outer attachment members includes an attachment surface that is configured to be attached to the one of the vibration generator and the vibration receiver, the attachment surface comprises a pair of opposing surfaces that are configured to hold and sandwich the one of the vibration generator and the vibration receiver between the pair of opposing surfaces, and at least one of the pair of opposing surfaces is shaped to be inclined in a manner that a distance between the pair of opposing surfaces is increased toward an outer end of the attachment surface.

Yet another aspect of the present disclosure resides in an attachment structure for the vibration-damping device according to the present disclosure, wherein the vibration-damping device is coupled to the one of the vibration generator and the vibration receiver via the at least one pair of outer attachment members of the vibration-damping device, by displacing the outer attachment members in an extending direction of the outer attachment members, while bringing the outer attachment members closer to each other toward the inner attachment member of the vibration-damping device, so as to mount the outer attachment members to the one of the vibration generator and the vibration receiver.

Advantageous Effects

The present disclosure provides a vibration-damping device and an attachment structure of the vibration-damping device that prevent an increase in the number of components at the time of assembling and mounting the vibration-damping device to a mounted object and that allow pre-compression to be applied to the vibration-damping device in the direction perpendicular to the axis.

BRIEF DESCRIPTION OF THE DRAWINGS

In the accompanying drawings:

FIGS. 2A and 2B illustrate how to mount a vibration-damping device of FIG. 1 to, in this example, vibration-damping-device-mounted portions of a vibration generator, and FIG. 2A is a plan view illustrating a state prior to the mounting to the vibration-damping-device-mounted portions, and FIG. 2B is a plan view illustrating a state after the mounting to the vibration-damping-device-mounted portions;

FIG. 4A is a plan view illustrating a stopper portion, and FIG. 4B is a plan view illustrating bolt fastening;

DETAILED DESCRIPTION

Hereinafter, embodiments of the present disclosure will be described with reference to the drawings.

Embodiment 1

Figure 1:
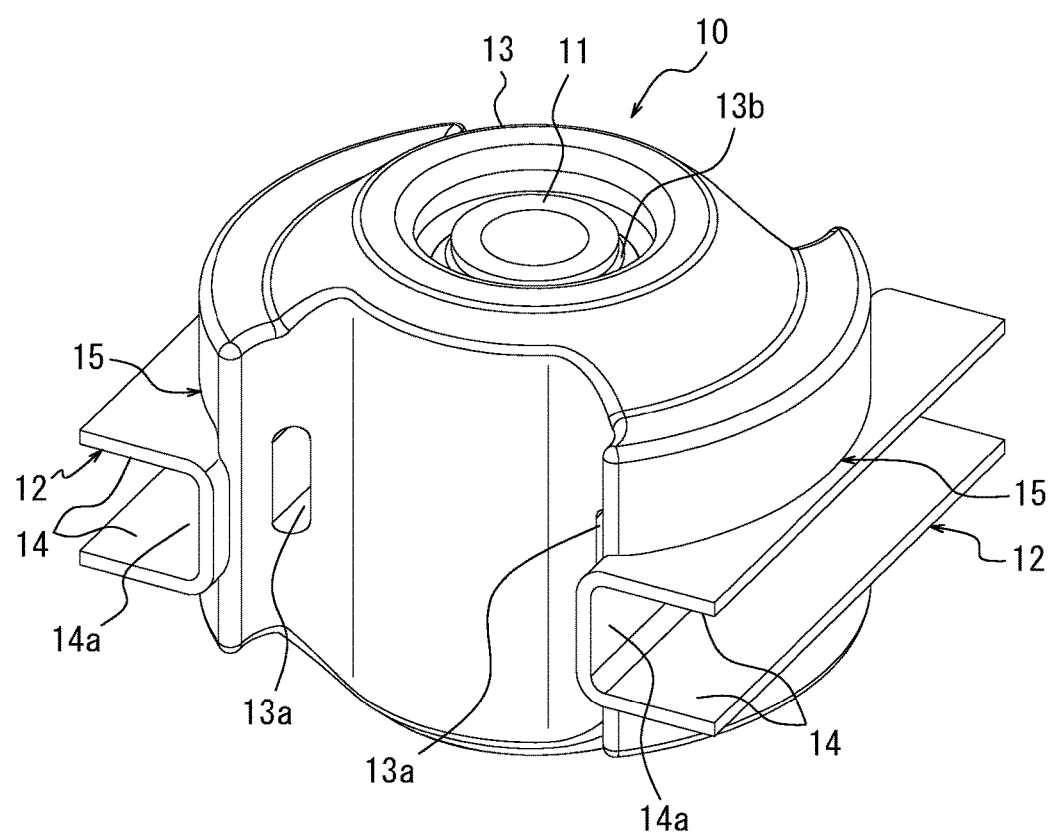
FIG. 1 is an external perspective view illustrating a vibration-damping device according to Embodiment 1 of the present disclosure.

FIG. 1 is an external perspective view illustrating a vibration-damping device according to Embodiment 1 of the present disclosure.

As illustrated in FIG. 1, a vibration-damping device 10 in the present embodiment includes an inner attachment member 11, an outer attachment member 12, and an elastic body 13. These are integrated by vulcanization-adhering the elastic body 13, which is positioned between the inner attachment member 11 and the outer attachment member 12, to be formed, for example, in a substantially cylindrical shape. The outer attachment member 12 is coupled to one of a vibration generator and a vibration receiver, and the inner attachment member 11 is coupled to the other one of the vibration generator and the vibration receiver.

The vibration-damping device 10 is mainly mounted between the vibration generator, such as an engine, and the vibration receiver, such as a frame, that are included in machinery and equipment for construction, agriculture, or the like By absorbing and damping vibration generated by the vibration generator, the vibration-damping device 10 prevents or interrupts transmission of the generated vibration to the vibration receiver.

The inner attachment 11 in the present embodiment is a cylindrical body, which is contained in the elastic body 13 in a vertically held state, with the long-axial direction of the cylindrical body being aligned with the vertical direction. The cylindrical body of the inner attachment 11 receives load applied to the vibration-damping device 10 in the axial direction of the cylindrical body. The shape of the inner attachment member 11 is not limited to cylindrical, and the inner attachment member 11 may be a tubular body having, for example, a rectangular section, or a bar shape. It is only necessary that the load applied to the vibration-damping device 10 may be received in the axial direction of the inner attachment member 11 and that the inner attachment member 11 may be locked and fixed to members to which the vibration-damping device 10 is mounted from both sides of the inner attachment member 11 in the axial direction with use of a bolt or the like.

The outer attachment member 12 in the present embodiment is a rail member having a U-shaped section and disposed in pair. The pair of outer attachment members 12 is disposed on the outer side of the elastic body 13 to sandwich the inner attachment member 11 from both the sides and is also disposed substantially in the middle in the axial direction of the elastic body 13, with the longitudinal direction thereof extending in a direction orthogonal to the axial direction of the inner attachment member 11.

Each of the pair of outer attachment members 12 is attached in the state where the outer attachment member 12 is laid on its side, with an opening side thereof facing the outer side, and where a substantially middle portion in the longitudinal direction of the outer attachment member 12 bites into a circumferential wall of the elastic body 13. Each of the pair of outer attachment members 12 includes an attachment surface 14, which is attached to the vibration generator or the vibration receiver. The attachment surface 14 in the present embodiment is formed by a pair of opposing surfaces opposing in the axial direction of the elastic body 13. With the pair of opposing surfaces, the outer attachment member 12 holds the vibration generator or the vibration receiver sandwiched.

The pair of opposing surfaces 14, which is disposed to oppose to each other as the attachment surfaces in the present embodiment, is disposed to extend along the direction orthogonal to the axial direction of the inner attachment member 11, which is positioned vertically. The pair of opposing surfaces 14 is coupled via a wall surface 14a, which contacts the circumferential wall of the elastic body 13. Thus, the pairs of opposing surfaces 14 are positioned, with the elastic body 13 being interposed therebetween from both the sides of the circumferential wall. A distance between both the wall surfaces 14a, which are positioned with the elastic body 13 being interposed therebetween, is formed to be greater than a clearance distance between vibration-damping-device-mounted portions 16a (later described) of a vibration generator 16, to which the vibration-damping device 10 is mounted.

The outer attachment member 12 is not limited to the rail member having a U-shaped section and may be, for example, a member having an L-shaped section. The outer attachment member 12 only needs to include the attachment surface 14, which is attached to the vibration generator or the vibration receiver. When the outer attachment member 12 is a member having an L-shaped section, the attachment surface 14 is formed by a single surface, not by the opposing surfaces. Furthermore, it is not necessarily needed to dispose a single pair of outer attachment members 12, and a plurality of pairs of outer attachment members 12 may be disposed to sandwich the inner attachment member 11 from both the sides. Each pair of outer attachment members 12 does not necessarily need to be disposed substantially in parallel in a plan view of the vibration-damping device 10. Moreover, the shape and positions of the outer attachment members 12 only need to correspond to the vibration generator or the vibration receiver to which the outer attachment members 12 are coupled, in more detail, to the vibration-damping-device-mounted portions 16a included in the vibration generator or the vibration receiver. Even when the outer attachment members 12 are disposed substantially in parallel in the plan view of the vibration-damping device 10, the positions do not need to be aligned and may be offset in the axial direction of the elastic body 13.

The elastic body 13 in the present embodiment is a substantially cylindrical body that is formed by a rubber member and that includes a pair of attachment-member-receiving portions 15, which is used to attach the outer attachment members to the outer circumferential surface. The elastic body 13 is positioned between the inner attachment member 11 and each outer attachment member 12 on the outer side of the inner attachment member 11 and couples the outer attachment member 12 and the inner attachment member 11. The elastic body 13 is not limited to the substantially cylindrical body and may be any tubular body, such as a tubular body having a rectangular section.

The pair of attachment-member-receiving portions 15 is disposed substantially in parallel, with the outer circumferential surface of the elastic body 13 being interposed therebetween, in substantially the middle in the axial direction of the elastic body 13, in a manner such that the pair of attachment-member-receiving portions 15 has a substantially H-shape in the plan view of the vibration-damping device 10 as viewed from one end surface in the axial direction thereof. In the present embodiment, each attachment-member-receiving portion 15 is formed in a concave shape that corresponds to an external shape of the corresponding outer attachment member 12 and that is integrated with the elastic body 13. The shape, the attachment position, and the like of the pair of attachment-member-receiving portions 15 may be adjusted in accordance with the shape, the attachment condition, or the like of the outer attachment members 12, which are attached thereto. There are also provided recess portions 13a, which pass through the elastic body 13. The recess portions 13a are positioned behind the attachment-member-receiving portions 15 and between the attachment-member-receiving portions 15 and the inner attachment member 11, which is contained in the elastic body 13.

By providing the recess portions 13a, stiffness of the elastic body 13 in the direction perpendicular to the axis (which corresponds to a direction of arrow Y in FIG. 3) is reduced, and transmission of vibration is interrupted. Furthermore, by adjusting the dimension of the recess portions 13a, stiffness of the elastic body 13 in the direction perpendicular to the axis may be adjusted at will.

To the elastic body 13, the inner attachment member 11, which is vulcanization-adhered to a through hole 13b, passing through the cylindrical body in the axial direction, is mounted while both the ends of the inner attachment member 11 in the axial direction are tucked in without being exposed from the elastic body 13. That is to say, a gap is provided between each end surface of the inner attachment member 11 and an end surface of the elastic body 13 on the extension of the end surface of the inner attachment member 11 in the axial direction.

Next, a description is given of the effect of the vibration-damping device 10 in the present embodiment that has the above configuration.

Figure 3:
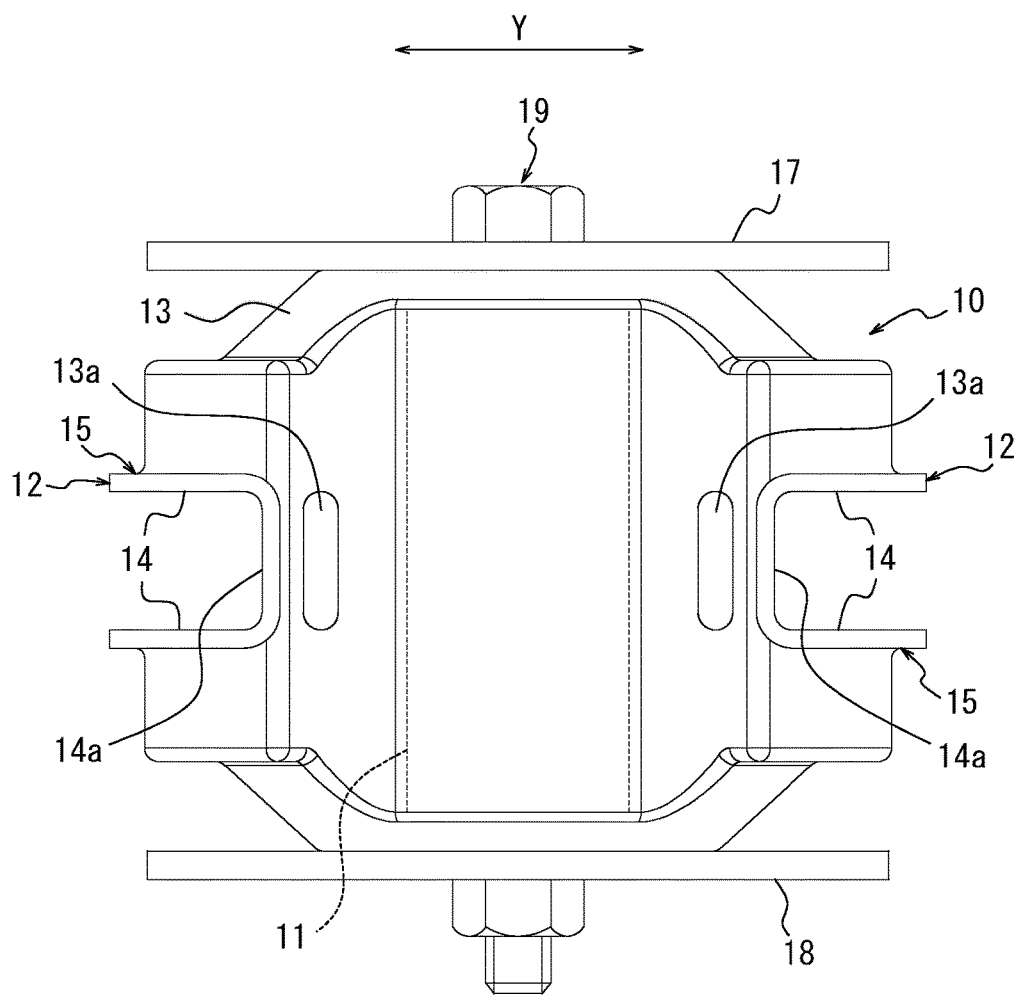
FIG. 3 illustrates a vibration-damping device of FIG. 1 as viewed from the side in a state where the vibration-damping device is mounted to a vibration generator in this example.

FIGS. 2A and 2B illustrate how to mount the vibration-damping device of FIG. 1 to, in this example, vibration-damping-device-mounted portions of the vibration generator. FIG. 2A is a plan view illustrating the state prior to the mounting to the vibration-damping-device-mounted portions, and FIG. 2B is a plan view illustrating a state after the mounting to the vibration-damping-device-mounted portions. FIG. 3 illustrates the vibration-damping device of FIG. 1 as viewed from the side in the state where the vibration-damping device is mounted to the vibration generator in this example.

Assume, for example, that the vibration-damping device 10 is mounted to the vibration generator 16, such as an engine. In this case, as illustrated in FIGS. 24 and 2B, firstly, the pair of outer attachment members 12, which is included in the vibration-damping device 10, is positioned between the pair of vibration-damping-device-mounted portions 16a, which is disposed side by side in the vibration generator 16. In the state where the pair of outer attachment members 12 is brought closer to each other toward the inner attachment member 11 (refer to arrows a in FIG. 2A), the vibration-damping device 10 is displaced laterally along the pair of vibration-damping-device-mounted portions 16a from protruding ends of the vibration-damping-device-mounted portions 16a (refer to FIG. 2A).

Subsequently, the displacement is continued until the entirety of the pair of outer attachment members 12, which is displaced laterally along the pair of vibration-damping-device-mounted portions 16a, covers the pair of vibration-damping-device-mounted portions 16a, and thus, the vibration-damping device 10 is put in place (refer to FIG. 2B). Herein, since the attachment surfaces 14, which are the pair of opposing surfaces, of each outer attachment member 12 is configured to hold the vibration generator 16 or the vibration receiver sandwiched, the corresponding vibration-damping-device-mounted portion 16a is fitted in between the attachment surfaces 14. Accordingly, the vibration-damping device 10 is attached reliably to one of the vibration generator 16 (the vibration-damping-device-mounted portions 16a) and the vibration receiver (in this example, the vibration generator 16) without being detached.

Subsequently, as illustrated in FIG. 3, in the state (refer to FIG. 2B) where the pair of outer attachment members 12, included in the vibration-damping device 10, is positioned between the pair of vibration-damping-device-mounted portions 16a, both the ends of the vibration-damping device 10 in the axial direction are sandwiched by the first bracket 17 and the second bracket 18. The first bracket 17 in this example is fixed to an automobile or the like as the vibration receiver. For example, by using a bolt 19, that is to say, by passing the bolt 19 from the first bracket 17 to the second bracket 18 thorough the inner attachment member 11, included in the vibration-damping device 10, and fastening the bolt 19 by nut tightening, the vibration-damping device 10 is fixed and mounted between the vibration generator 16 and the vibration receiver, while the elastic body 13 is compressed from both the sides in the axial direction.

At the time of mounting the vibration-damping device 10 between the vibration generator 16 and the vibration receiver, pre-compression is applied to the vibration-damping device 10 in its axial direction since the gap is provided between each end surface of the inner attachment member 11 and the end surface of the elastic body 13 on the extension of the end surface of the inner attachment member 11.

The vibration-damping device 10, which is mounted between the vibration generator 16 and the vibration receiver, is applied with load in the axial direction of the inner attachment member 11 from the vibration generator 16 via the pair of outer attachment members 12. Since the attachment surfaces 14 are disposed along the direction perpendicular to the axial direction of the inner attachment member 11, it is ensured that the load applied to the vibration-damping device 10 is received by the pair of attachment surfaces 14.

In the present vibration-damping device 10, at the time of displacing the vibration-damping device 10 laterally along the pair of vibration-damping-device-mounted portions 16a, each of the pair of vibration-damping-device-mounted portions 16a is fitted in the recess portion of the corresponding one of the pair of outer attachment members 12. Since the distance between both the wall surfaces 14a, which are positioned with the elastic body 13 being interposed therebetween, of the attachment surfaces 14 is formed to be greater than the distance between the pair of vibration-damping-device-mounted portions 16a, which is disposed side by side, the vibration-damping device 10 is assembled to the vibration-damping-device-mounted portions 16a in the state where the vibration-damping device 10 is compressed from both the sides in the direction orthogonal to the axial direction of the vibration-damping device 10 (refer to the arrows a in FIG. 2A), that is to say, the elastic body 13 is compressed in the direction by which the pair of outer attachment members 12 is brought to closer to each other.

That is to say, the pair of outer attachment members 12, which is included in the vibration-damping device 10, is mounted to one of the vibration generator 16 and the vibration receiver (in this example, the vibration generator 16) by displacing the pair of outer attachment members 12 in the direction in which the outer attachment members 12 extend in the state where the outer attachment members 12 are brought closer to each other toward the inner attachment member 11, which is included in the vibration-damping device 10. By doing so, the vibration-damping device 10 is coupled to one of the vibration generator 16 and the vibration receiver this example, the vibration generator 16) via the outer attachment members 12.

Accordingly, the vibration-damping device 10, when being mounted to the vibration generator 16 or the vibration receiver, is applied with pre-compression easily in the direction orthogonal to the axial direction of the inner attachment member 11, that is to say, in the direction in which the inner attachment member 11 is sandwiched. This improves durability of the vibration-damping device 10 against deformation in the direction orthogonal to the axial direction of the vibration-damping device 10 (in the direction of the arrows a in FIG. 2A).

Furthermore, by displacing the vibration-damping device 10 laterally to the vibration generator 16 or the vibration receiver from the side, the vibration-damping device 10 is mounted in the state where the vibration generator 16 or the vibration receiver is sandwiched from both the sides. Accordingly, there is no need for dividing the overall inner tube into upper and lower inner tubes as is conventionally needed to combine the two pieces of the vibration-damping rubber and mount them, with the vibration generator being sandwiched from both the sides. This also omits the need to consider a decrease in area used for fastening, in end surfaces of both the inner tubes that are joined at the time of assembly, that occurs when the inner tubes, as a result of division, are disposed due to misalignment between the end surfaces of both the inner tubes that are joined.

Moreover, even when the vibration-damping device 10 is assembled and mounted in the state where the vibration generator 16 or the vibration receiver, to which the vibration-damping device 10 is mounted, is sandwiched from both the sides (in the present embodiment, from both the sides of the vibration-damping device 10 in the axial direction), only the single vibration-damping device 10 is necessary. Accordingly, compared with cases where, for example, the two pieces of the vibration-damping rubber need to be combined in use as in the conventional practice, the number of components is reduced.

The vibration generator 16 or the vibration receiver, to which the vibration-damping device 10 is mounted, may also be provided with a falling-off prevention mechanism that prevents the vibration-damping device 10 from falling off from the vibration generator 16 or the vibration receiver.

Figure 4A:
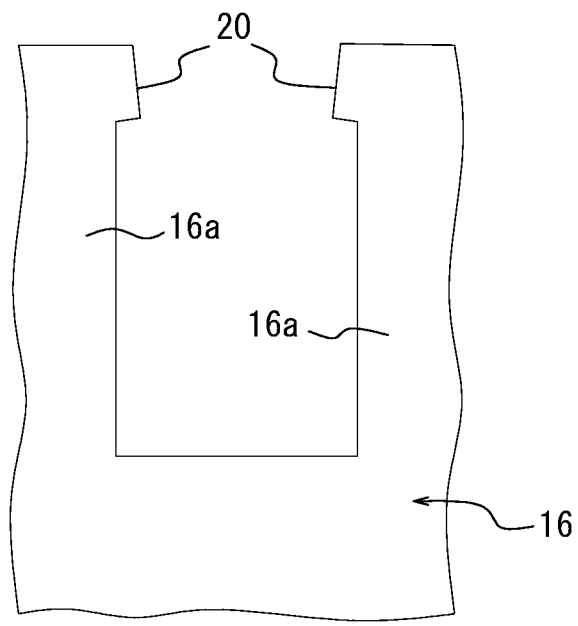
FIGS. 4A and 4B illustrate an example of a falling-off prevention mechanism for a vibration-damping device of FIG. 1 that is included in a vibration generator or a vibration receiver.
Figure 4B:
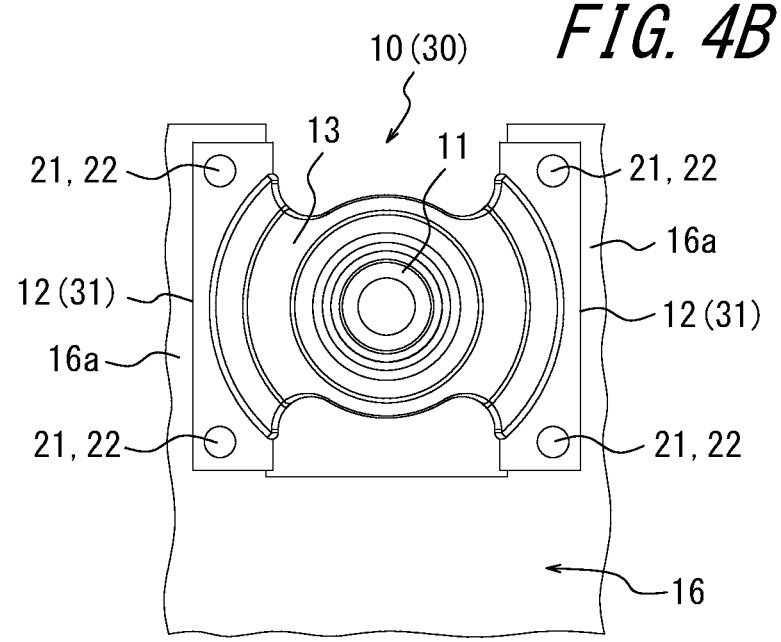

FIGS. 4A and 4B illustrate an example of the falling-off prevention mechanism for the vibration-damping device of FIG. 1 that is included in the vibration generator or the vibration receiver. FIG. 4A is a plan view illustrating a stopper portion, and FIG. 4B is a plan view illustrating bolt fastening.

The vibration generator 16 or the vibration receiver, to which the vibration-damping device 10 is mounted, is provided with stopper portions that prevent displacement (in the present embodiment, horizontal displacement with respect to the vibration generator 16) of the vibration-damping device 10 at the time of mounting the vibration-damping device 10. In the following, a description is given with an example in which the vibration-damping device 10 is mounted to the vibration generator 16.

As illustrated in FIG. 4A, when the vibration-damping device 10 is mounted to the vibration generator 16, stopper portions 20 are formed in the protruding ends of the pair of vibration-damping-device-mounted portions 16a, which is included in the vibration generator 16, so that the stopper portions 20 protrude to the inner side to oppose to each other. The vibration-damping device 10 is mounted to the vibration-damping-device-mounted portions 16a, in which the stopper portions 20 are formed, by compressing the vibration-damping device 10 from both the sides in the direction (refer to the arrows a in FIG. 2a) that is orthogonal to the axial direction of the vibration-damping device 10 to narrow its width. The stopper portions 20 restrict displacement of the pair of outer attachment members 12, which is attached to the pair of vibration-damping-device-mounted portions 16a, toward the protruding ends of the pair of vibration-damping-device-mounted portions 16a, thereby preventing the pair of outer attachment members 12 from slipping out of the protruding ends. Accordingly, even when, for example, unexpected load is applied to the vibration-damping device 10, which is mounted to the vibration generator 16, the vibration-damping device 10 is further prevented from falling off from the vibration generator 16.

Furthermore, the vibration generator 16 or the vibration receiver, to which the vibration-damping device 10 is mounted, is provided with through holes through which the vibration-damping device 10 is bolt-fastened. In the following, the example in which the vibration-damping device 10 is mounted to the vibration generator 16 is described.

As illustrated in FIG. 4B, through holes 21 are provided, for example, in both end portions of each of the pair of attachment-member-receiving portions 15, which is included in the vibration-damping device 10, and through holes 22 are provided in each of the vibration-damping-device-mounted portions 16a so that the through holes 22 communicate with the thorough holes 21 in the state where the vibration-damping device 10 is mounted to the vibration generator 16. This allows bolt-fastening through the thorough holes 21 and the through holes 22. By the bolt-fastening, the pair of outer attachment members 12, which is attached to the pair of vibration-damping-device-mounted portions 16a, is fixed to the pair of vibration-damping-device-mounted portions 16a. Accordingly, even when, for example, unexpected load is applied to the vibration-damping device 10, which is mounted to the vibration generator 16, the vibration-damping device 10 is even further prevented from falling off from the vibration generator 16.

Next, a modification of the aforementioned vibration-damping device 10 according to Embodiment 1 is illustrated.

Figure 5:
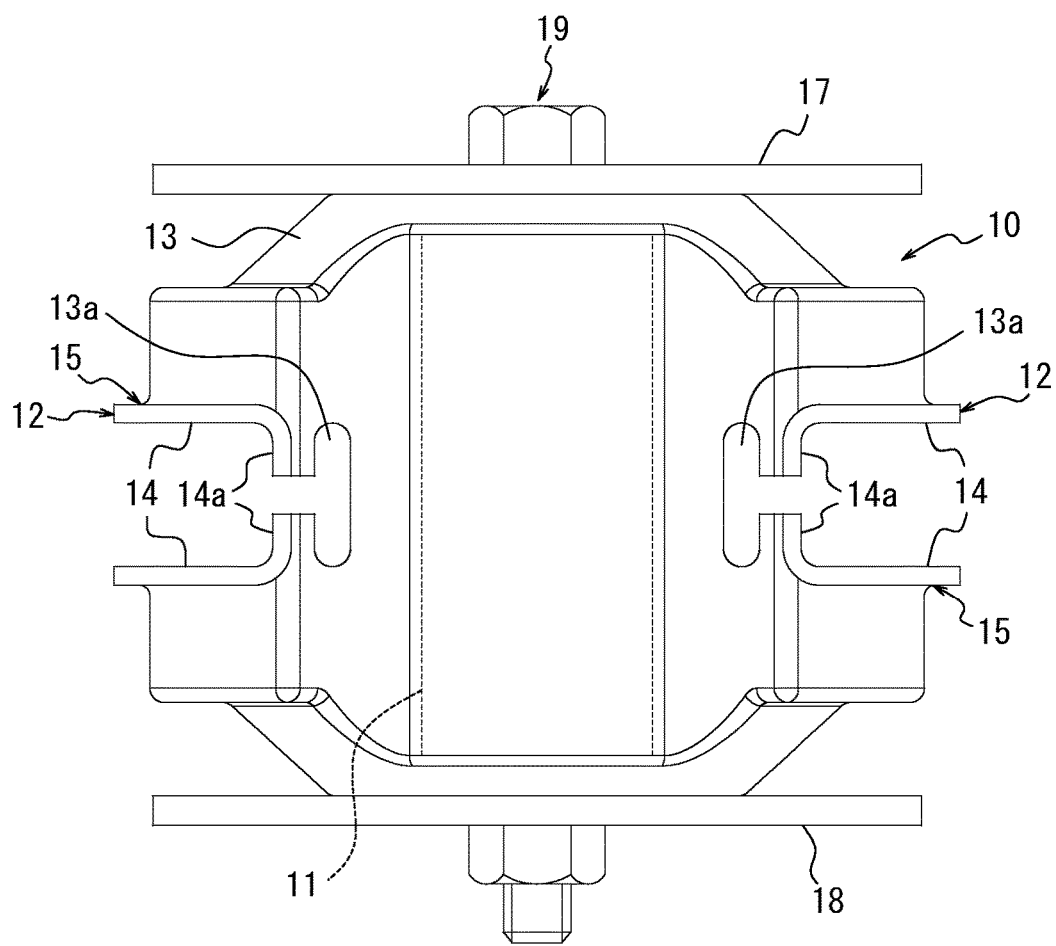
FIG. 5 illustrates a modification of a vibration-damping device of FIG. 1 as viewed from the side in a state where the vibration-damping device is mounted to a vibration generator in this example.

FIG. 5 illustrates another example of the configuration of the vibration-damping device of FIG. 1 as viewed from the side in the state where the vibration-damping device is mounted to the vibration generator in this example. As illustrated in FIG. 5, the wall surface 14a of each of the pair of outer attachment members 12, which is included in the vibration-damping device 10, together with the elastic body 13, may be divided in the axial direction of the vibration-damping device 10. By dividing the wall surface 14a, which couples the pair of opposing attachment surfaces 14, the attachment surfaces 14, that is to say, the pair of opposing surfaces, together with a portion of the elastic body 13 that extends to the corresponding recess portion 13a, are divided into divided bodies each including a different one of the opposing surfaces separately in the axial direction of the vibration-damping device 10.

Consequently, at the time of mounting the vibration-damping device 10 to the vibration generator 16 or the vibration receiver, the pair of outer attachment members 12 is attached to the vibration generator 16 or the vibration receiver while being sandwiched from both the sides in the axial direction of the vibration-damping device 10. Accordingly, at the time of mounting the vibration-damping device 10 to the other one of the vibration generator 16 and the vibration receiver, sufficient pre-compression is applied to the vibration-damping device 10 also in the axial direction.

Additionally the present embodiment illustrates the example in which each of the pair of outer attachment members 12 is formed to have a U-shaped section or an L-shaped section. However, when the vibration-damping-device-mounted portions 16a, to which the pair of outer attachment members 12 is mounted, have a concave shape that has a U-shaped section, an L-shaped section, or the like, the outer attachment members 12 may be formed in a convex shape that corresponds to the concave shape of the vibration-damping-device-mounted portions 16a to receive the vibration-damping-device-mounted portions 16a. Furthermore, although in the present embodiment the pair of outer attachment members 12 is disposed with respect to the elastic body 13 along the direction perpendicular to the axial direction of the inner attachment member 11, the pair of outer attachment members 12 may also be disposed in the axial direction (along the axial direction or in a direction inclined with respect to the axial direction) of the inner attachment member 11 depending on the mounting condition of the vibration-damping device 10.

Moreover, by adjusting the amount of pre-compression applied in the direction perpendicular to the axial direction of the vibration-damping device 10 and adjusting the recess portions 13a, which are provided in the vibration-damping device 10, non-linear characteristics are imparted in directions (in FIG. 24, in directions opposite to the arrows a in FIG. 2A, that is to say, in left and right directions from a viewer's perspective) from the inner attachment member 11 to the outer attachment members 12 of the vibration-damping device 10.

Moreover, the shape of the vibration generator 16 and the vibration receiver, to which the vibration-damping device 10 is mounted, may be changed. For example, the vibration generator 16 illustrated in the present embodiment may be provided with a projection that, when the vibration-damping device 10 is displaced laterally for mounting, abuts against the vibration-damping device 10 to stop the displacement. By doing so, non-linearity is imparted to characteristics of the vibration-damping device 10 in directions (in FIG. 24, upper and lower directions from a viewer's perspective) that are orthogonal to the aforementioned directions from the inner attachment member 11 to the outer attachment members 12.

Embodiment 2

In the following, a vibration-damping device 30 according to Embodiment 2 of the present disclosure is described with reference to the drawings.

Figure 6:
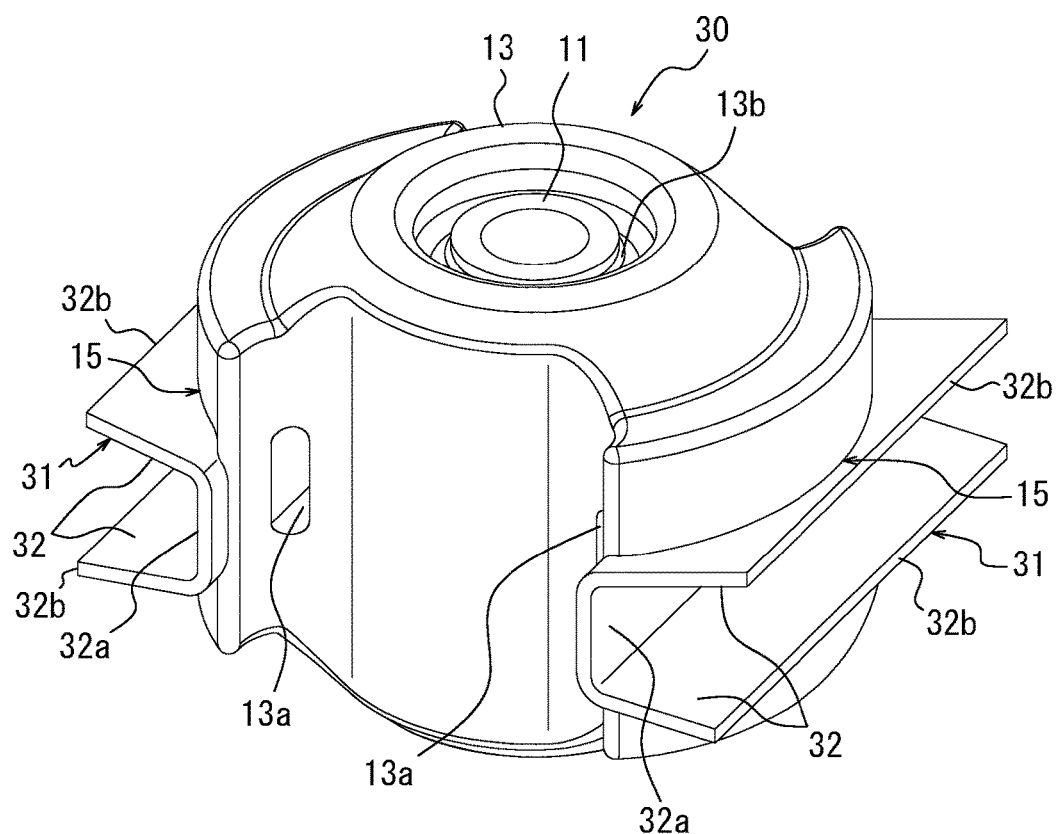
FIG. 6 is an external perspective view illustrating a vibration-damping device according to Embodiment 2 of the present disclosure.

FIG. 6 is an external perspective view illustrating a vibration-damping device according to Embodiment 2 of the present disclosure.

The vibration-damping device 30 according to Embodiment 2 of the present disclosure includes a pair of outer attachment members 31, instead of the pair of outer attachment members 12, included in the vibration-damping device 10 according to Embodiment 1. In terms of the configuration and effects apart from the above difference, the vibration-damping device 30 is the same as the vibration-damping device 10. In the following, the same constituents as those in the vibration-damping device 10 are assigned with the same reference numerals, and a description thereof is omitted.

As illustrated in FIG. 6, at least one (in this example, both) of a pair of opposing surfaces 32, which constitute the attachment surfaces of each of the pair of outer attachment members 31, included in the vibration-damping device 30, is shaped to be inclined in a manner such that a distance between the opposing surfaces that the pair of opposing surfaces 32 defines is increased toward outer ends 32b of the attachment surfaces. That is to say, the distance on the side of the wall surface 32a is smaller than on the side of the outer ends 32a of the attachment surfaces.

An inclination angle of the opposing surfaces 32, which are formed in the inclined shape, may be set from 1° to 60°, preferably from 5° to 45°, providing that the inclination angle is 0° when the distance between the opposing surfaces is constant without any inclination. In this example, both of the pair of opposing surfaces 32 are inclined to opposite directions from the direction perpendicular to the axial direction of the inner attachment member 11 and preferably at the same angle with respect to the direction perpendicular to the axial direction of the inner attachment member 11.

It is not necessarily needed to shape both of the pair of opposing surfaces 32 to be inclined as in the present embodiment, and, for example, only one of the opposing surfaces 32 may be shaped to be inclined. At least one of the pair of opposing surfaces 32 needs to be shaped to be inclined in a manner such that the distance between the pair of opposing surfaces 32 is increased toward the outer ends 32b of the attachment surfaces.

The pair of opposing surfaces 32, at least one (in this example, both) of which is shaped to be inclined, is coupled by the wall surface 32a, which contacts a circumferential wall of the elastic body 13 Thus, the pairs of opposing surfaces 32 are positioned, with the elastic body 13 being interposed therebetween from both sides of the circumferential wall. A distance between both the wall surfaces 32a, which are positioned with the elastic body 13 being interposed therebetween, is formed to be greater than the distance between the vibration-damping-device-mounted portions 16a (later described) of the vibration generator 16, to which the vibration-damping device 30 is mounted.

As illustrated in FIG. 6, the vibration-damping-device-mounted portions 16a of the vibration generator 16, to which the pair of outer attachment members 31 each including the pair of opposing surfaces 32 is attached, are shaped to be inclined in correspondence with the opposing surfaces 32. That is to say, in the present embodiment, both surfaces of each vibration-damping-device-mounted portion 16a, which is sandwiched between the corresponding pair of opposing surfaces 32, are shaped to be inclined and tapered toward tips thereof to be mounted, in correspondence with the distance between the opposing surfaces 32 that is smaller on the side of the wall surface 32a than on the side of the outer ends 32a of the attachment surfaces. Accordingly, when the pair of outer attachment members 31 is attached to the vibration-damping-device-mounted portions 16a, abutment surfaces of each vibration-damping-device-mounted portion 16a and abutment surfaces of the corresponding pair of opposing surfaces 32 are brought into tightly sealed contact (refer to FIG. 8).

Each outer side attachment member 31 is not limited to the rail member having a U-shaped section and may be, for example, a member having an L-shaped section. The outer side attachment member 31 only needs to include the attachment surface 32, which is attached to the vibration generator or the vibration receiver. When the outer side attachment member 31 is a member having an L-shaped section, the attachment surface 32 is formed by a single surface, not by the opposing surfaces. Furthermore, it is not necessarily needed to dispose a single pair of outer attachment members 31, and a plurality of pairs of outer attachment members 31 may be disposed to sandwich the inner attachment member 11 from both the sides. Each pair of outer attachment members 31 does not necessarily need to be disposed substantially in parallel in a plan view of the vibration-damping device 30. Moreover, the shape and positions of the outer attachment members 31 only need to correspond to the vibration generator or the vibration receiver to which the outer attachment members 31 are coupled, in more detail, to the vibration-damping-device-mounted portions 16a included in the vibration generator or the vibration receiver. Even when the outer attachment members 31 are disposed substantially in parallel in the plan view of the vibration-damping device 30, the positions do not need to be aligned and may be offset in the axial direction of the elastic body 13.

The pair of attachment-member-receiving portions 15 is disposed substantially in parallel, with the outer circumferential surface of the elastic body 13 being interposed therebetween, in substantially the middle in the axial direction of the elastic body 13. In the present embodiment, each attachment-member-receiving portion 15 is formed in a concave shape that corresponds to an external shape of the corresponding outer attachment member 31 and that is integrated with the elastic body 13. The shape, the attachment position, and the like of the pair of attachment-member-receiving portions 15 may be adjusted in accordance with the shape, the attachment condition, or the like of the outer attachment members 31, which are attached thereto. There are also provided recess portions 13a, which pass through the elastic body 13 in the direction perpendicular to the axis. The recess portions 13a are positioned behind the attachment-member-receiving portions 15 and between the attachment-member-receiving portions 15 and the inner attachment member 11, which is contained in the elastic body 13.

Next, a description is given of the effect of the vibration-damping device 30 in the present embodiment that has the above configuration.

Assume, for example, that the vibration-damping device 30 is mounted to the vibration generator 16, such as an engine. In this case, as illustrated in FIGS. 2A and 2B, firstly, the pair of outer attachment members 31, which is included in the vibration-damping device 30, is positioned between the pair of vibration-damping-device-mounted portions 16a, which is disposed side by side in the vibration generator 16. In the state where the pair of outer attachment members 31 is brought closer to each other toward the inner attachment member 11 (refer to the arrows a in FIG. 2A), the vibration-damping device 30 is displaced laterally along the pair of vibration-damping-device-mounted portions 16a from the protruding ends of the vibration-damping-device-mounted portions 16a (refer to FIG. 2A).

During the horizontal displacement of the vibration-damping device 30, since both the surfaces of each vibration-damping-device-mounted portion 16a, which is sandwiched between the corresponding pair of opposing surfaces 32, are shaped to be inclined and tapered toward the tips thereof to be mounted, in correspondence with the distance between the opposing surfaces 32 that is smaller on the side of the wall surface 32a than on the side of the outer ends 32a of the attachment surfaces, the vibration-damping-device-mounted portion 16a is fitted in between the outer ends 32b of the attachment surfaces easily while allowing a gap therebetween. That is to say, at the time of assembling the vibration-damping device 30 to the vibration-damping-device-mounted portions 16a, the vibration-damping-device-mounted portions 16a are fitted in the pair of outer attachment portions 31 easily without the need for alignment or the like. Furthermore, there is no need for a clearance between the opposing surfaces 32 of each of the pair of outer attachment members 31 and the corresponding vibration-damping-device-mounted portion 16a. Thus, the assembly is facilitated.

The result is that the need for the clearance, which would otherwise be necessary at the time of assembling the vibration-damping device 30 to the vibration-damping-device-mounted portions 16a, between the opposing surfaces 32 of each of the pair of outer attachment members 31 and the corresponding vibration-damping-device-mounted portion 16a is eliminated. Accordingly, after the assembly, the pair of outer attachment members 31 and the vibration-damping-device-mounted portions 16a are prevented from contacting upon and moving away from each other repeatedly, thereby causing wear, deformation, fracture, or the like of the outer attachment members 31 due to load inputted upward and downward in the axial direction to the vibration-damping device 30 as a result of a gap created between the pair of outer attachment members 31 and the vibration-damping-device-mounted portions 16a by the clearance.

After each vibration-damping-device-mounted portion 16a is fitted in between the outer ends 32b of the corresponding attachment surfaces, the vibration-damping-device-mounted portion 16a and the pair of opposing surfaces 32 are displaced along their inclined surfaces. As the vibration-damping-device-mounted portion 16a is displaced closer to the wall surface 32a, the gap between the vibration-damping-device-mounted portion 16a and the pair of opposing surfaces 32 is decreased.

Subsequently, the displacement is continued until the entirety of the pair of outer attachment members 31, which is displaced laterally along the pair of vibration-damping-device-mounted portions 16a, covers the pair of vibration-damping-device-mounted portions 16a, and thus, the vibration-damping device 30 is put in place (refer to FIG. 2B). Herein, since the attachment surfaces 32, which are the pair of opposing surfaces 32, of each outer attachment member 31 is configured to hold the vibration generator 16 or the vibration receiver sandwiched, the corresponding vibration-damping-device-mounted portion 16a is fitted in the opposing surfaces 32. At this time, the tip of the vibration-damping-device-mounted portion 16a to be mounted abuts against the wall surface 32a. Thus, the vibration-damping-device-mounted portions 16a, which are fitted in the pair of outer attachment members 31, and the pair of outer attachment members 31 are brought into tightly sealed contact (refer to FIGS. 4A and 4B)

Accordingly, the vibration-damping device 30 is attached reliably to one of the vibration generator 16 (the vibration-damping-device-mounted portions 16a) and the vibration receiver (in this example, the vibration generator 16) without being detached.

Figure 7:
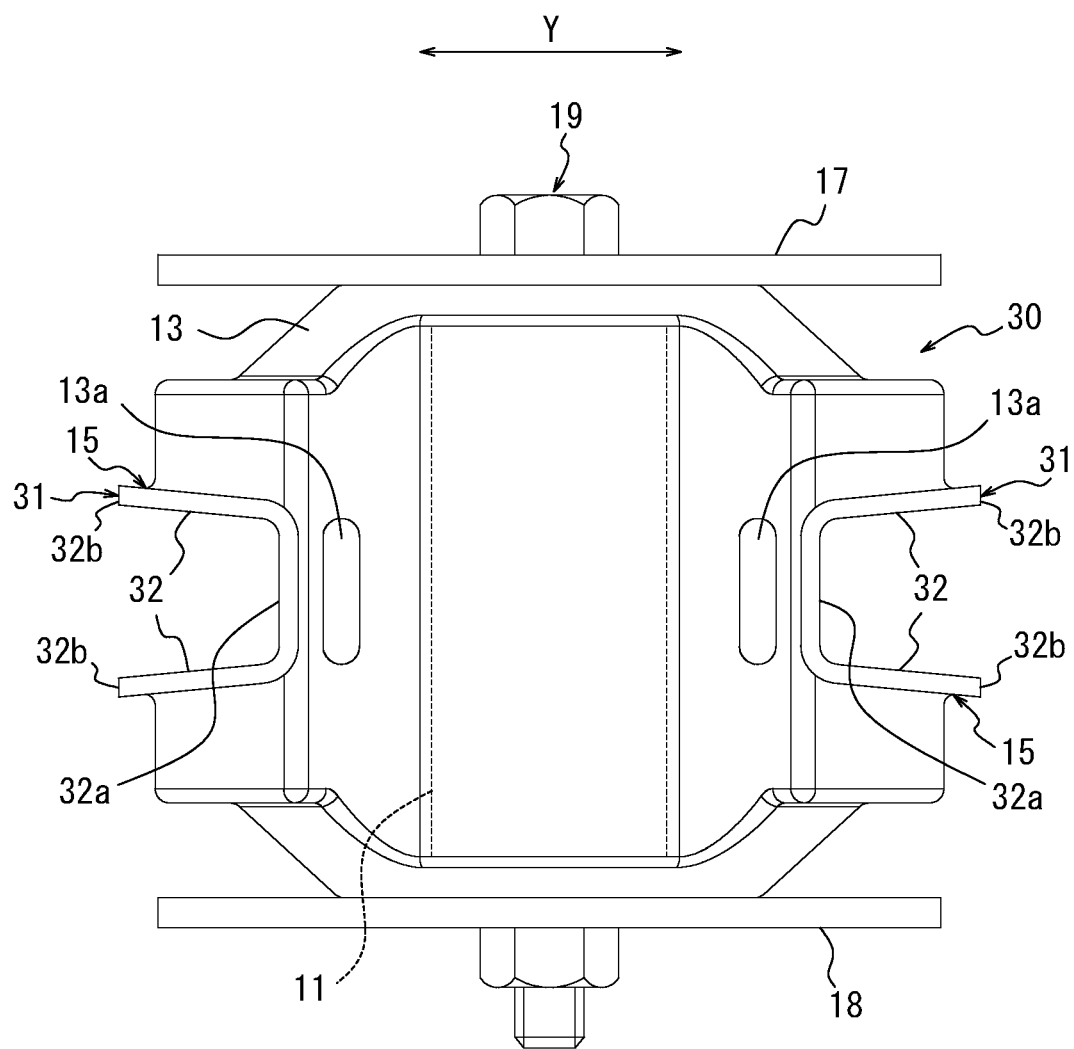
FIG. 7 illustrates, partially in cross section, a vibration-damping device of FIG. 6 in a state where the vibration-damping device is mounted onto brackets.

Subsequently, as illustrated in FIG. 7, in the state (refer to FIG. 2B) where the pair of outer attachment members 31, included in the vibration-damping device 30, is positioned between the pair of vibration-damping-device-mounted portions 16a, both the ends of the vibration-damping device 30 in the axial direction are sandwiched by the first bracket 17 and the second bracket 18. The first bracket 17 in this example is fixed to an automobile or the like as the vibration receiver. For example, by using a bolt 19, that is to say, by passing the bolt 19 from the first bracket 17 to the second bracket 18 thorough the inner attachment member 11, included in the vibration-damping device 30, and fastening the bolt 19 by nut tightening, the vibration-damping device 30 is fixed and mounted between the vibration generator 16 and the vibration receiver, while the elastic body 13 is compressed from both the sides in the axial direction.

Figure 8:
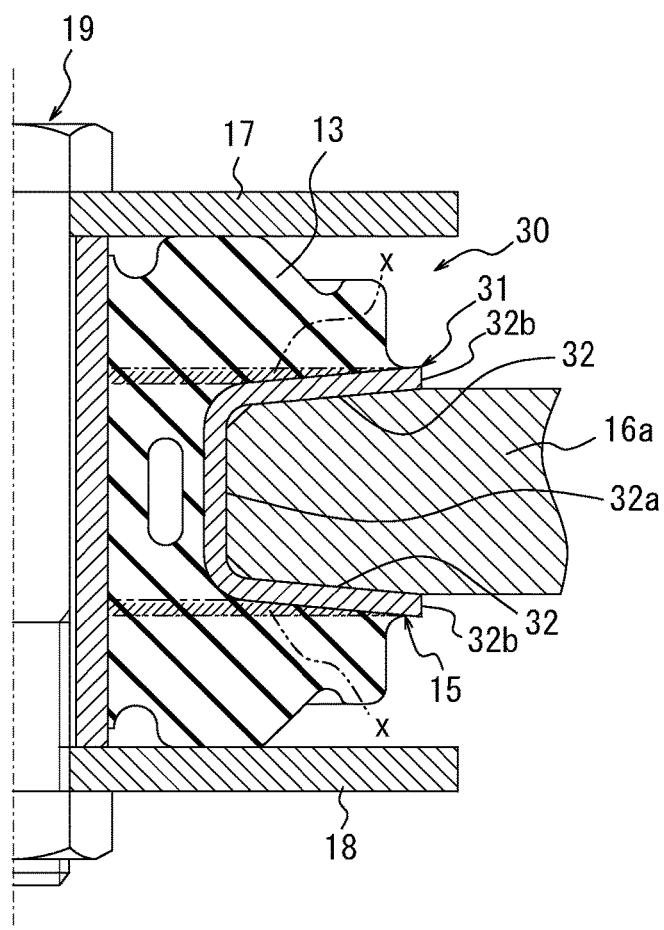
FIG. 8 illustrates, partially in cross section, a vibration-damping device of FIG. 6 in a state where the vibration-damping device is mounted onto brackets.

As illustrated in FIG. 8, in the vibration-damping device 30, which is mounted between the vibration generator 16 and the vibration receiver, at least one (in this example, both) of the pair of opposing surfaces 32 is shaped to be inclined in a manner such that the distance between the opposing surfaces that the pair of opposing surfaces 32 defines is increased toward the outer ends 32b of the attachment surfaces. Furthermore, each vibration-damping-device-mounted portion 16a is shaped to be inclined in correspondence with the opposing surfaces 32 of the corresponding one of the pair of outer attachment members 32. Accordingly, when the pair of outer attachment members 31 is attached to the vibration-damping-device-mounted portions 16a, abutment surfaces of each vibration-damping-device-mounted portion 16a and abutment surfaces of the corresponding pair of opposing surfaces 32 are brought into tightly sealed contact. Consequently, a contact area of the pair of outer attachment members 31 with respect to the vibration-damping-device-mounted portions 16a, to which the pair of outer attachment members 31 is attached, is increased, and a backlash is prevented. Furthermore, due to the increased contact area, surface pressure to the outer attachment members 31 is reduced.

Herein, the vibration-damping-device-mounted portions 16a are preferably in sealed contact with the opposing surfaces 32 over the entire surfaces thereof. However, the backlash is prevented as long as a part, such as the tips to be mounted or portions corresponding to the outer ends 32b of the attachment surfaces, of the vibration-damping-device-mounted portions 16a are in sealed contact.

Additionally, the inclination angle of each vibration-damping-device-mounted portions 16a with respect to the corresponding pair of opposing surfaces 32 is preferably the same or greater than the inclination angle of the opposing surfaces 32.

At the time of mounting the vibration-damping device 30 between the vibration generator 16 and the vibration receiver, pre-compression is applied to the vibration-damping device 30 in its axial direction since the gap is provided between each end surface of the inner attachment member 11 and the end surface of the elastic body 13 on the extension of the end surface of the inner attachment member 11.

The vibration-damping device 30, which is mounted between the vibration generator 16 and the vibration receiver, is applied with load in the axial direction of the inner attachment member 11 from the vibration generator 16 via the inner tube member. It is ensured that the load applied to the vibration-damping device 30 is received by the pair of attachment surfaces 32.

In the present vibration-damping device 30, at the time of displacing the vibration-damping device 30 laterally along the pair of vibration-damping-device-mounted portions 16a, each of the pair of vibration-damping-device-mounted portions 16a is fitted in the recess portion of the corresponding one of the pair of outer attachment members 31. Since the distance between both the wall surfaces 32a, which are positioned with the elastic body 13 being interposed therebetween, of the attachment surfaces 32 is formed to be greater than the distance between the pair of vibration-damping-device-mounted portions 16a, which is disposed side by side, the vibration-damping device 30 is assembled to the vibration-damping-device-mounted portions 16a in the state where the vibration-damping device 30 is compressed from both the sides in the direction orthogonal to the axial direction of the vibration-damping device 10 (refer to the arrows a in FIG. 2A), that is to say, the elastic body 13 is compressed in the direction by which the pair of outer attachment members 31 is brought to closer to each other.

That is to say, the pair of outer attachment members 12, which is included in the vibration-damping device 30, is mounted to one of the vibration generator 16 and the vibration receiver (in this example, the vibration generator 16) by displacing the pair of outer attachment members 31 in the direction in which the outer attachment members 31 extend in the state where the outer attachment members 31 are brought closer to each other toward the inner attachment member 11, which is included in the vibration-damping device 30. By doing so, the vibration-damping device 30 is coupled to one of the vibration generator 16 and the vibration receiver (in this example, the vibration generator 16) via the outer attachment members 31.

Accordingly, the vibration-damping device 30, when being mounted to the vibration generator 16 or the vibration receiver, is applied with pre-compression easily in the direction orthogonal to the axial direction of the inner attachment member 11, that is to say, in the direction in which the inner attachment member 11 is sandwiched. This improves durability of the vibration-damping device 30 against deformation in the direction orthogonal to the axial direction of the vibration-damping device 30 (in the direction of the arrows a in FIG. 2A). Besides, at least one (in this example, both) of the pair of opposing surfaces 32 is shaped to be inclined in a manner such that the distance between the opposing surfaces that the pair of opposing surfaces 32 defines is increased toward the outer ends 32b of the attachment surfaces, that is to say, that the distance on the side of the wall surface 32a is smaller than on the side of the outer ends 32a of the attachment surfaces. Accordingly, compared with cases where the pair of opposing surfaces 32 is not shaped to be inclined, the amount of pre-compression applied in the direction orthogonal to the axial direction of the inner attachment member 11, that is to say, in the direction in which the inner attachment member 11 is sandwiched, is increased by the inclined-shaped portions (refer to x in FIG. 8). This further improves durability of the vibration-damping device 30 against deformation.

Furthermore, similarly to the vibration-damping device 10, by displacing the vibration-damping device 30 laterally to the vibration generator 16 or the vibration receiver from the side, the vibration-damping device 30 is mounted in the state where the vibration generator 16 or the vibration receiver is sandwiched from both the sides. Accordingly, there is no need for dividing the overall inner tube into upper and lower inner tubes. Even when the vibration-damping device 30 is assembled and mounted in the state where the vibration generator 16 or the vibration receiver, to which the vibration-damping device 30 is mounted, is sandwiched from both the sides (in the present embodiment, from both the sides in the axial direction of the vibration-damping device 30), only the single vibration-damping device 30 is necessary. In cases of the vibration-damping device 30, as in the vibration-damping device 10, the vibration generator 16 or the vibration receiver, to which the vibration-damping device 30 is mounted, may also be provided with the falling-off prevention mechanism that prevents the vibration-damping device 30 from falling off from the vibration generator 16 or the vibration receiver (refer to FIGS. 4A and 4B).

Next, a modification of the aforementioned vibration-damping device 30 according to Embodiment 2 is illustrated.

Figure 9:
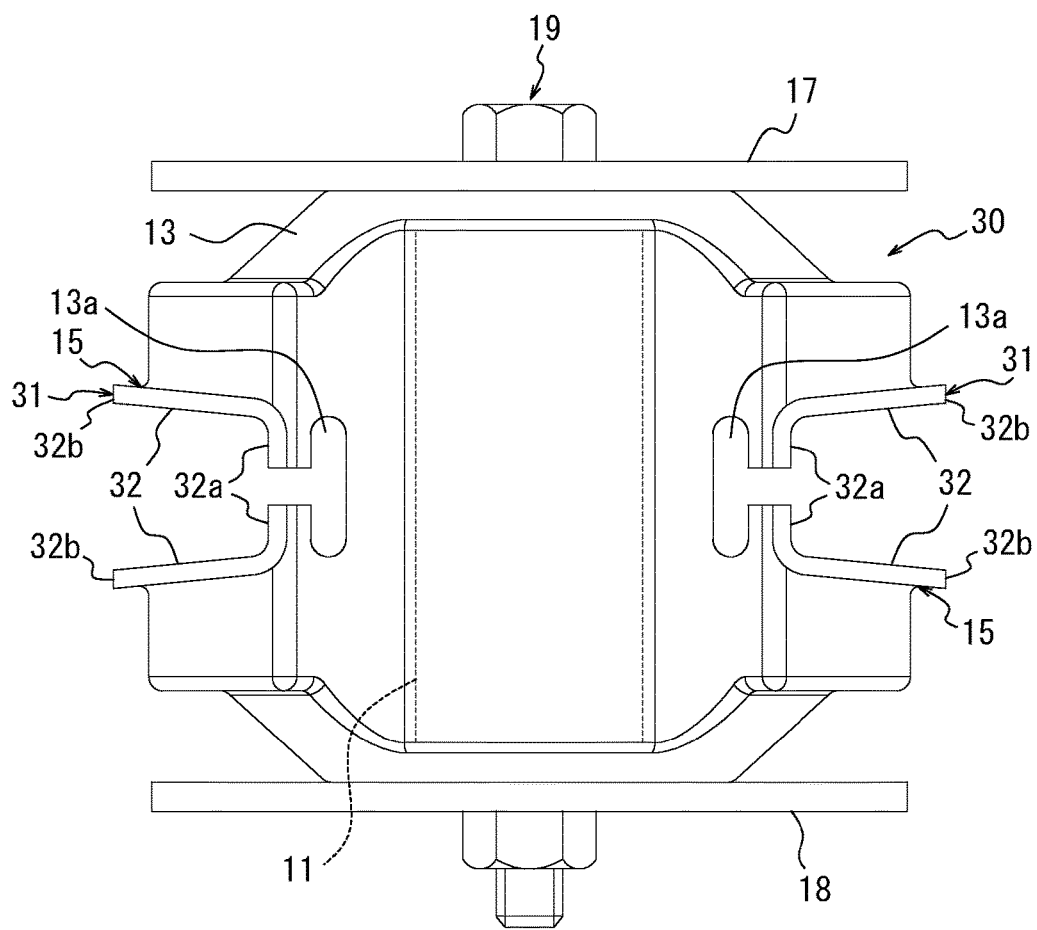
FIG. 9 illustrates a modification of a vibration-damping device of FIG. 6 as viewed from the side in a state where the vibration-damping device is mounted onto brackets.

FIG. 9 illustrates another example of the configuration of the vibration-damping device of FIG. 6 as viewed from the side in the state where the vibration-damping device is mounted to the brackets. As illustrated in FIG. 9, the wall surface 32a of each of the pair of outer attachment members 12, which is included in the vibration-damping device 30, together with the elastic body 13, may be divided in the axial direction of the vibration-damping device 30. By dividing the wall surface 32a, which couples the pair of opposing surfaces 32, the attachment surfaces, that is to say, the pair of opposing surfaces 32, together with a portion of the elastic body 13 that extends to the corresponding recess portion 13a, are divided into divided bodies each including a different one of the opposing surfaces separately in the axial direction of the vibration-damping device 30.

Consequently, at the time of mounting the vibration-damping device 30 to the vibration generator 16 or the vibration receiver, the pair of outer attachment members 31 is attached to the vibration generator 16 or the vibration receiver while being sandwiched from both the sides in the axial direction of the vibration-damping device 30. Accordingly, at the time of mounting the vibration-damping device 30 to the other one of the vibration generator 16 and the vibration receiver, sufficient pre-compression is applied to the vibration-damping device 30 also in the axial direction.

Furthermore, although in the present embodiment the pair of outer attachment members 31 is disposed with respect to the elastic body 13 along the direction perpendicular to the axial direction of the inner attachment member 11, the pair of outer attachment members 31 may also be disposed in the axial direction (along the axial direction or in a direction inclined with respect to the axial direction) of the inner attachment member 11 depending on the mounting condition of the vibration-damping device 30.

Moreover, by adjusting the amount of pre-compression applied in the direction perpendicular to the axial direction of the vibration-damping device 30 and adjusting the recess portions 13a, which are provided in the vibration-damping device 30, non-linear characteristics are imparted in directions (in FIG. 2A, in the left and right directions from a viewer's perspective) from the inner attachment member 11 to the outer attachment members 12 of the vibration-damping device 30.

REFERENCE SIGNS LIST 10, 30 Vibration-damping device
11 Inner attachment member
12, 31 Outer attachment member 13 Elastic body
13a Recess portion
14, 32 Opposing surface (attachment surface)
14a. 32a Wall surface
15 Attachment-member-receiving portion
16 Vibration generator
16a Vibration-damping-device-mounted portion
17 First bracket
18 Second bracket
19 Bolt
20 Stopper portion
21, 22 Through hole

The invention claimed is:

1. An attachment structure for a vibration-damping device, the vibration-damping device comprising
outer attachment members configured to be coupled to one of a vibration generator and a vibration receiver,
an inner attachment member configured to be coupled to another one of the vibration generator and the vibration receiver, and
an elastic body positioned on an outer side of the inner attachment member and coupling the outer attachment members with the inner attachment member, wherein:
at least one pair of the outer attachment members are disposed on the outer side of the elastic body, with the inner attachment member being interposed between the at least one pair of outer attachment members,
each of the at least one pair of outer attachment members includes an attachment surface that is configured to be attached to the one of the vibration generator and the vibration receiver, the attachment surface comprising:
a pair of opposing surfaces that are configured to hold and sandwich the one of the vibration generator and the vibration receiver between the pair of opposing surfaces; and
a wall surface connecting the pair of opposing surfaces, the wall surface extending in an axial direction between the pair of opposing surfaces,
the vibration-damping device is coupled to the one of the vibration generator and the vibration receiver via the at least one pair of outer attachment members of the vibration-damping device, by displacing the outer attachment members in an extending direction of the outer attachment members, while bringing the outer attachment members closer to each other toward the inner attachment member of the vibration-damping device, so as to mount the outer attachment members to the one of the vibration generator and the vibration receiver, and
the pair of opposing surfaces protrude outwardly from the wall surface in a radial direction of the inner attachment member.

2. The attachment structure according to claim 1, wherein the outer attachment member comprises divided bodies, each of which separately includes a respective one of the pair of opposing surfaces.

3. The attachment structure according to claim 1, wherein the attachment surface of the outer attachment member is disposed along a direction that is perpendicular to the axial direction of the inner attachment member.

4. The attachment structure according to claim 1, wherein the attachment surface of the outer attachment member is disposed along a direction that is perpendicular to the axial direction of the inner attachment member.

5. The attachment structure according to claim 2, wherein the attachment surface of the outer attachment member is disposed along a direction that is perpendicular to the axial direction of the inner attachment member.

6. An attachment structure for a vibration-damping device, vibration-damping device comprising
an outer attachment member configured to be coupled to one of a vibration generator and a vibration receiver,
an inner attachment member configured to be coupled to another one of the vibration generator and the vibration receiver, and
an elastic body positioned on an outer side of the inner attachment member and coupling the outer attachment member with the inner attachment member, wherein
at least one pair of the outer attachment members are disposed on the outer side of the elastic body, with the inner attachment member being interposed between the at least one pair of outer attachment members,
each of the at least one pair of outer attachment members includes an attachment surface that is configured to be attached to the one of the vibration generator and the vibration receiver,
the attachment surface comprises:
a pair of opposing surfaces that are configured to hold and sandwich the one of the vibration generator and the vibration receiver between the pair of opposing surfaces; and
a wall surface connecting the pair of opposing surfaces, the wall surface extending in an axial direction between the pair of opposing surfaces,
at least one of the pair of opposing surfaces is shaped to be inclined in a manner that a distance between the pair of opposing surfaces is continually increased from an inner end of the attachment surface to an outermost end of the attachment surface, and
the vibration-damping device is coupled to the one of the vibration generator and the vibration receiver via the at least one pair of outer attachment members of the vibration-damping device, by displacing the outer attachment members in an extending direction of the outer attachment members, while bringing the outer attachment members closer to each other toward the inner attachment member of the vibration-damping device, so as to mount the outer attachment members to the one of the vibration generator and the vibration receiver.

7. The attachment structure according to claim 6, wherein the outer attachment member comprises divided bodies, each of which separately includes a respective one of the pair of opposing surfaces.

8. The attachment structure for the vibration-damping device according to claim 6, wherein a surface of the one of the vibration generator and the vibration receiver configured to contact with the at least one of the pair of opposing surfaces is shaped to be inclined in correspondence with the at least one of the pair of opposing surfaces.

9. The attachment structure for the vibration-damping device according to claim 6, wherein a surface of the one of the vibration generator and the vibration receiver configured to contact with the at least one of the pair of opposing surfaces is shaped to be inclined in correspondence with the at least one of the pair of opposing surfaces.

10. A vibration-damping device, comprising
outer attachment members configured to be coupled to one of a vibration generator and a vibration receiver,
an inner attachment member configured to be coupled to another one of the vibration generator and the vibration receiver, and an elastic body positioned on an outer side of the inner attachment member and coupling the outer attachment members with the inner attachment member, wherein:

the outer attachment members comprise at least one pair of the outer attachment members disposed on the outer side of the elastic body, with the inner attachment member being interposed between the at least one pair of outer attachment members, each of the at least one pair of outer attachment members includes an attachment surface that is configured to be attached to the one of the vibration generator and the vibration receiver, the attachment surface comprising:
  a pair of opposing surfaces that are configured to hold and sandwich the one of the vibration generator and the vibration receiver between the pair of opposing surfaces; and
  a wall surface connecting the pair of opposing surfaces, the wall surface extending in an axial direction between the pair of opposing surfaces, and each of the pair of outer attachment members is attached in the state where each of the pair of outer attachment members is laid on its side, with an opening side thereof facing the outer side of the elastic body, and where each of the pair of outer attachment members protrudes into a circumferential wall of the elastic body, and the pair of opposing surfaces protrude outwardly from the wall surface in a radial direction of the inner attachment member.

11. A vibration-damping device, comprising an outer attachment member configured to be coupled to one of a vibration generator and a vibration receiver, an inner attachment member configured to be coupled to another one of the vibration generator and the vibration receiver, and an elastic body positioned on an outer side of the inner attachment member and coupling the outer attachment member with the inner attachment member, wherein:

the outer attachment member comprises at least one pair of the outer attachment members disposed on the outer side of the elastic body, with the inner attachment member being interposed between the at least one pair of outer attachment members, each of the at least one pair of outer attachment members includes an attachment surface that is configured to be attached to the one of the vibration generator and the vibration receiver, the attachment surface comprises:
  a pair of opposing surfaces that are configured to hold and sandwich the one of the vibration generator and the vibration receiver between the pair of opposing surfaces; and
  a wall surface connecting the pair of opposing surfaces, the wall surface extending in an axial direction between the pair of opposing surfaces, at least one of the pair of opposing surfaces is shaped to be inclined in a manner that a distance between the pair of opposing surfaces is continually increased from an inner end of the attachment surface to an outermost end of the attachment surface, and each of the pair of outer attachment members is attached in the state where each of the pair of outer attachment members is laid on its side, with an opening side thereof facing the outer side of the elastic body, and where each of the pair of outer attachment members bites into a circumferential wall of the elastic body.

* * * * *